(12) United States Patent
Zimmermann et al.

(10) Patent No.: US 10,837,929 B2
(45) Date of Patent: Nov. 17, 2020

(54) PREPARATION FOR A DISTILLATION MEASUREMENT

(71) Applicant: Anton Paar ProveTec GmbH, Blankenfelde-Mahlow (DE)

(72) Inventors: Frank Zimmermann, Schöneiche (DE); Carsten Kindt, Berlin (DE); Daniel Pergande, Teltow (DE)

(73) Assignee: Anton Paar Provetec GmbH, Blankenfelde-Mahlow (DE)

( * ) Notice: Subject to any disclaimer, the term of this patent is extended or adjusted under 35 U.S.C. 154(b) by 0 days.

(21) Appl. No.: 16/413,532

(22) Filed: May 15, 2019

(65) Prior Publication Data
US 2019/0353604 A1 Nov. 21, 2019

(30) Foreign Application Priority Data
May 16, 2018 (DE) .......... 10 2018 111 816

(51) Int. Cl.
*G01N 25/14* (2006.01)
*B01L 9/00* (2006.01)
(Continued)

(52) U.S. Cl.
CPC .............. *G01N 25/14* (2013.01); *B01D 3/42* (2013.01); *B01L 3/08* (2013.01); *B01L 7/00* (2013.01);
(Continued)

(58) Field of Classification Search
CPC ...... B01L 3/08; B01L 3/42; B01L 7/00; B01L 9/00; B01L 9/02; B01D 19/0404; G01N 25/08; G01N 25/10; G01N 25/14
See application file for complete search history.

(56) References Cited

U.S. PATENT DOCUMENTS

| 8,367,022 B2 | 2/2013 | Warhurst et al. |
| 2017/0121139 A1 | 5/2017 | Gillier et al. |

(Continued)

FOREIGN PATENT DOCUMENTS

| AT | 412 025 B | 8/2004 |
| CN | 104 959 176 A | 10/2015 |

(Continued)

OTHER PUBLICATIONS

EP1967269A1_ENG (Espacenet machine translation of Marie) (Year: 2008).*

(Continued)

*Primary Examiner* — Jonathan Miller
*Assistant Examiner* — Gabriel E Gitman
(74) *Attorney, Agent, or Firm* — Robert A. Blaha; Smith Tempel Blaha LLC

(57) ABSTRACT

An arrangement for preparation of a distillation measurement of a liquid includes a heater and a traversing system. The heater supports a perforated plate selected from a group of standardized perforated plates which further supports a container containing the liquid. The heater is enabled and controlled during the performance of a standardized test for determining evaporation properties of the liquid. The traversing system is adapted to traverse the heater and to interrupt a further traversing of the heater, if a pressure force of the perforated plate put onto the heater against the container reaches a threshold value.

13 Claims, 2 Drawing Sheets

(51) Int. Cl.
  *B01D 3/42* (2006.01)
  *B01L 9/04* (2006.01)
  *B01L 7/00* (2006.01)
  *B01L 9/02* (2006.01)
  *B01L 3/08* (2006.01)
  *G01N 25/08* (2006.01)

(52) U.S. Cl.
  CPC . *B01L 9/00* (2013.01); *B01L 9/02* (2013.01); *G01N 25/08* (2013.01)

(56) References Cited

U.S. PATENT DOCUMENTS

| | | | |
|---|---|---|---|
| 2017/0212139 A1 | 7/2017 | Jaeggi | |
| 2018/0036648 A1* | 2/2018 | Urvantsau | B01D 3/4233 |

FOREIGN PATENT DOCUMENTS

| | | | | |
|---|---|---|---|---|
| DE | 24 19 156 | A1 | 11/1975 | |
| DE | 33 20 450 | A1 | 3/1984 | |
| DE | 10 2016 211 413 | A1 | 12/2017 | |
| DE | 10 2016 117 521 | A1 | 3/2018 | |
| EP | 1967269 | A1 * | 9/2008 | ............. G01N 25/10 |
| EP | 1967848 | A1 * | 9/2008 | ............. B01D 3/143 |
| EP | 1 967 269 | B1 | 10/2011 | |
| EP | 1 967 848 | B1 | 12/2011 | |

OTHER PUBLICATIONS

EP1967848A1_ENG (Espacenet machine translation of Marie) (Year: 2008).*

Extended European Search Report in EP 19 174 595.5 dated Nov. 15, 2019; pp. 1-7; European Patent Office, 80298, Munich, Germany.

* cited by examiner

PREPARATION FOR A DISTILLATION MEASUREMENT

CROSS-REFERENCE TO RELATED APPLICATION

This application claims priority to German Patent Application No. 10 2018 111 816.3 filed on May 16, 2018, the disclosure of which is incorporated herein by reference.

TECHNICAL FIELD

The present invention relates to an arrangement for preparation of a distillation measurement of a liquid, further relates to a liquid analysis system, in particular automatic distillation unit for determining evaporation properties of a liquid according to at least one standardized test, and further relates to a method for preparation of a distillation measurement of a liquid.

TECHNOLOGICAL BACKGROUND

According to norms of the standardized tests for analyzing evaporation properties of liquids it is prescribed that depending on the flask size and depending on the liquid sample to be analyzed, one of four different perforated plates or isolation plates have to be selected which must be placed onto the heating equipment, in order to heat the flask with the sample to be analyzed according to standardized conditions. The perforated plates or isolating plates differ for example in the diameter of the hole in the center of the plate, at which edge the round bottom flask rests during the standardized measurement or during the standardized test. Thereby, the perforated plate rests on the heating equipment which is guided from below towards the flask, until the perforated plate tightly seals the flask from the bottom side.

EP 1 967 269 B1 discloses an automatic positioning arrangement with a heating chamber opposite to a distillation flask which comprises an immobile stand, a heating chamber with a heating element, a set of distillation flasks with plug and therein in-built thermometers, a set of isolation plates and means for controlling the heater. A sliding carriage is, via a spring with constant force, connected to the heating chamber, to move the heating chamber between an idle position and a working position. Therefore, manual actuation means for movement of the sliding carriage and locking means for fixing the working position are provided.

EP 1 967 848 B1 discloses a decoding arrangement of isolation plates for a standardized distillation device, wherein into an isolation plate, decoding holes are provided and are distributed on a surface of the decoder based on the model which is specific for the surface. A set of sensors is associated to the corresponding decoding holes and the sensors send detection signals which represent the isolation plate, in order to verify whether an isolation plate which corresponds to a predetermined test standard is interfaced between the heating element and a distillation flask.

Conventionally, a perforated plate is selected before the conduction of a standardized test by a user. Thereby, a mistake may occur, in that the user selects a wrong perforated plate and puts it onto the heating equipment. When using a wrong perforated plate, the test cannot be carried out faultlessly, the test in particular cannot be performed according to the standard or the norm. In this case, the test has to be interrupted, the correct perforated plate has to be selected and has to be put onto the heating arrangement and the test has to be restarted. Thereby, time effort and costs increase.

SUMMARY

An arrangement and a corresponding method for preparation of a distillation measurement of a liquid are disclosed, wherein a standardized test for determining evaporation properties of the liquid can be carried out in a faster manner and in a more reliable manner. Such arrangements and methods avoid handling faults and further the perforated plate can be exactly and without fault be positioned at the flask. In addition, these arrangements and methods avoid damage of the glass flask due to a destructive impact force from below, which is mediated via the perforated plate.

According to an embodiment of the present invention it is provided an arrangement for preparation of a distillation measurement of a liquid, comprising: a heater, onto which a perforated plate selected from a group of standardized perforated plates may be put on and which is adapted for heating a container containing the liquid and being put onto the perforated plate for performing a standardized test for determining evaporation properties of the liquid; a, in particular electric, traversing system which is adapted to traverse the heater (e.g. vertically upwards) and to interrupt a further traversing the heater, if a pressure force of the perforated plate put onto the heater against the container reaches a threshold value.

Overview of Embodiments

The present invention is within the field of the automatic (or atmospheric) distillation units (ADU) with which according to different norms (for example ASTM D86) the boiling behaviour of liquid, in particular of petrol products or solvents, can be determined. Thereby, a standardized sample container, the so-called flask, is heated from below and the thereby generated distillate is led away via a condenser into a collecting container. The distillation behavior of the liquid is inter alia characterized using a temperature measurement.

The distillation measurement may include a standardized test according to a norm, for example ASTM-norm or ISO-norm.

According to accurately prescribed guidelines in the applicable standard test, according to embodiments of the present invention, a predetermined volume of a sample is filled into the sample container (for example flask) and the sample container is closed with the arrangement for closing. The sample is then heated under defined conditions, so that portions of the sample evaporate. The vapour is cooled within a condenser line and the condensate is collected into a cylinder. During the performance of the test, the temperature of the vapour is recorded using the temperature measurement system and also the time is recorded. As results of a standardized automatic distillation test, for example the following parameters may be obtained:
- initial boiling point, i.e. the temperature, at which the first droplet of the distillate falls into the collection cylinder
- end boiling point, i.e. the maximal temperature during the distillation
- the total volume of the distillate collected in the reception cylinder
- the rest of the sample remaining within the distillation container the dry point, i.e. the temperature, at which the last droplet of the distillate evaporates from the bottom of the container distillation curve.

The distillation curve can be obtained in that the temperature is drawn against the relative recovery volume in the reception cylinder. From the distillation curve, for example, the boiling range of the sample can be derived as the difference between the maximal temperature and the minimal temperature.

In particular, embodiments of the present invention are suitable for carrying out standard tests for the distillation of petrol products, such as for example ASTM D86 (groups 0 to 4), ISO3405, IP123, BS2000-123, respectively, in the version valid at the priority date. Embodiments of the present invention are further suited to carry out standard tests for the distillation of solvent, such as ASTM D1078, IP 95, BS2000-195, ASTM D850. As results of the performance of the tests, a respective distillation curve of the examined sample as well as for example the dry point can be obtained. The above-mentioned tests are at least performable according to the respective versions of the standard tests which are valid at the priority date.

Embodiments of the present invention may for example support a standardized examination of a sample having a boiling range between for example 20° C. and 400° C. In particular, the standards ASTM D86, ASTM D850, ASTM D1078 may be supported, as well as ISO 3405, IP 123, IP 195, respectively, in the version valid at the priority date. The specifications of these standard tests may for example be obtained from ASTM (for example www.ASTM.org). According to embodiments of the present invention, a vapor temperature range from 0° C. to 450° C., a condenser temperature range from 0° C. to 80° C. and a chamber temperature range from 0° C. to 50° C. can be supported. Further, an atmospheric pressure sensor may be included in embodiments which enable to automatically correct the result to standard pressure.

In particular, embodiments of the present invention are designed for characterizing petrol products, in particular different from desalting arrangements for seawater, equipment for drinking water preparation, purification plants for wastewater, chemical equipment for the treatment of carbohydrates, rotation evaporators, distillation equipment for the processing of biological material. In particular, embodiments of the present invention provide a standardized distillation equipment, in particular an automatic distillation equipment under atmospheric pressure for liquid samples, in particular for samples of mineral oil products, wherein the measurement of the distillation parameters is carried out according to a predefined test standard which is selected from a plurality of possible standards from which above some examples were given.

In an alternative embodiment, a standardized distillation device for measurement of distillation parameters under reduced pressure or under vacuum may be provided.

The perforated plate may be manufactured from isolating material and may comprise a central opening or a central recess which is circular. The diameter of the circular recess in the perforated plate may be smaller than the diameter of a container, in particular a round flask. The perforated plate may be reversibly connectable with the heater, such as by one or more clamps, a screwing mechanism, magnetic elements or the like. The container, in particular glass round flask, may, after putting the perforated plate onto the heater, put onto the perforated plate such that the edge of the circular recess contacts an outer surface, in particular a stripe of a spherical surface, to achieve that a predetermined portion of the round flask which is situated below the plane of the perforated plate, is arranged in a predetermined position relative to heating elements of the heater. Thereby, a heating of the liquid contained within the container may be achieved according to one or more defined norms or standards. The heater may comprise electrical heating elements.

The liquid may be in particular a mineral oil product or a mixture of mineral oil products or for example crude petroleum. Other examples of liquid are for example solvents which are used in the color industry for dispersing of pigments.

The traversing system may in particular comprise electric components, such as an electric motor, in particular step motor, which is utilized as a drive for traversing the heater. After actuating a switch, the electric traversing system may automatically traverse the heater upwards, until the edge of the perforated plate limiting the circle-shaped opening contacts the round flask from below in a circular shape and until the pressure force reaches the threshold value. A manual interference of a user may not be required after starting the (electric) driving system. Thus, the arrangement may be adapted, after putting the perforated plate onto the heater, to traverse the heating system to the flask in such a manner that thereupon, without further manual interference of a user, a test according to at least one standard for determination of evaporation properties of the liquid can be prepared and then carried out.

The traversing system in particular does not require any manual interference of a user, in order to traverse the heater (upwards), i.e. to move it upwards. Thereby, erroneous handling can be avoided. Also, the (in particular electric) traversing system may be adapted, to move the heater with a suitable velocity, for example with constant velocity, which avoids damage of components. The traversing system may also be adapted, for example at a relatively large distance between the perforated plate and the flask, to initially provide a relatively high traversing velocity which is continuously or in steps decreased with the decrease of the distance between the perforated plate and the flask. Thereby, a fast preparation may be achieved without having the risk of a damage.

In the case, particular used components, in particular the perforated plate and/or the container, are not compatible with a (in particular previously selected) standard test, the arrangement may acoustically and/or optionally indicate this non-compatibility. Further, carrying out a standardized test in such a case may be prohibited by a suitable control of further components which in the normal operation support the test, such as the heater itself, temperature measurement system, processing system, display system, etc.

Thereby, a fast preparation of a standardized test may be achieved and upon usage of erroneous components, a warning may be indicated such that handling faults, in particular carrying out further test steps in erroneous manner, may be prohibited.

According to an embodiment of the present invention, the traversing system comprises a traversable carrier system by which the heater is retained, wherein the arrangement is adapted to monitor and/or to determine a quantity indicative for the length and/or the position along the traversing path of the carrier system, in particular number of steps of a step motor.

The carrier system is traversable, in particular electrically traversable, in particular vertically movable upwards and in particular driven by an electric motor for movement. The carrier system may for example include an arm, a bar or rod, a table or a combination of the same, in order to carry, to support or to hold the heater. The carrier system may comprise several components, for example a component which is engaged with a driving motor (for example indirectly via a spindle) and a second component which holds or supports the heater. The first component and the second component not necessarily are connected by a rigid connection, but may be for example connected via an elastic connection, for example a spring, in particular spiral spring, which may be utilized for force measurement. The pressure force may for example be measured based on a deformation of the spring, such as a spiral spring, or for example via piezoelectric elements. The threshold value may be adjusted according to the specific application or according to the standardized test, such as in dependence of the utilized container and/or the utilized perforated plate or can be applicable for a number of different standardized perforated plates and a number of different standardized containers. In particular, the threshold value may correspond or be equal to a pregiven pressure force according to a predetermined test standard.

During traversing the carrier system, the position along the traversing path of the carrier system changes. The traversing path may for example be a linear, i.e. straight, traversing path, such as exactly vertically upwards. The traversing path may be defined by one or more rails and/or by a spindle which is driven by a motor. The pressure force may be a force in the vertical direction between the perforated plate and the flask or the container.

Before the carrier system together with the heater and the perforated plate is traversed towards (the lower end) of the container, the container may be supported at an upper end by one or more holding elements (in fixed position), without holding the lower container region, in particular glass round flask. The lower portion of the container may thus be free of further supporting elements. In particular, a space below the container may be vacant so that the heater together with the perforated plate may be approached without danger from below towards the container. The support or holder at the upper region of the container may be so strong that it may withstand the pressure force according to the threshold value.

The quantity indicative for the position of the traversing path of the carrier system may for example be given in a length unit or in a number of turns of a step motor or may be represented by a voltage or similar. The position may for example be defined relative to a reference position, such as starting position, such as by a length value in a length unit such as millimeters or by the indication of a number of steps or turns which were applied by a step motor or another electromotor. The quantity indicative for the length along the traversing path of the carrier system may for example be determined by a difference between a reference position and a current position of the carrier system. The position of the carrier system may relate for example to a position of a particular component or a particular detail of the carrier system. In particular, the position of the carrier system may relate either to a position of the first component which is primarily traversed by a motor, in particular electromotor, or may relate to a position of a second component, which is for example via an electric element elastically connected with the first component of the carrier system.

According to an embodiment of the present invention, the arrangement is adapted to traverse the carrier system starting from a start position, in particular a predetermined initial position, up to an end position of the carrier system, at which the pressure force reaches the threshold value, wherein the quantity indicative for the position along the traversing path associated to the start position has a first value and wherein the quantity indicative for the position along the traversing path associated to the end position has a second value, wherein the arrangement is adapted to calculate the difference between the first value and the second value as a difference value indicative for the traversed traversing length.

The end position of the carrier system may correspond to the state at which the perforated plate is completely traversed towards the container so that the edge of the hole of the perforated plate partly encompasses the container and contacts an outer wall, in particular in a circular shape. Via the contact between the edge of the hole and the outer surface of the container, the pressure force according to the threshold value in the end position is mediated. The starting position may be any position during the entire previously traversed traversing path, may in particular be a predefined initial position. The starting position is lower than the end position. For carrying out a corresponding preparation method, the (electric) traversing system is at least adapted, to traverse the heater (together with the perforated plate) upwards.

In order to allow exchanging the perforated plate and/or the container, for example after successfully conducting a standardized test, the traversing system may be adapted also, to traverse the heater (together with the perforated plate) downwards again, in particular to the starting position, in particular back to the initial position. The velocity of the return traversal may first be relatively small, in order to slowly release the perforated plate from the container which avoids its damage. Later, the velocity of the return traversal may be increased, without having to damage further components. In other embodiments, the velocity during the return traversal is substantially constant. The velocity may however be for example faster than the velocity during the upward traversal.

The difference value is thus indicative for the traversal length between the starting position and the end position. In particular, the difference value may be different for usage of different perforated plates and/or may also be different upon usage of different containers and may in particular be pairwise different upon usage of different combinations of containers and perforated plates. Thus, based on a determined difference value, the used combination of perforated plate and container may unambiguously be determinable. Thus, the arrangement may be adapted to determine the presence or absence of a compatibility of the used combination of perforated plate and container with a previously selected standard test and to indicate for example a warning for an absent compatibility. Therefore, it may be avoided to carry out a particular standardized test with wrong components.

According to an embodiment of the present invention, the arrangement is further adapted: based on the difference value, in particular further based on a type and/or a size and/or an identifier of the container, to infer and/or to display via an acoustic and/or optical display system a type and/or a size and/or an identifier of the perforated plate; and/or based on the difference value to infer and/or to display via an acoustic and/or optical display system a type and/or size and/or an identifier of the perforated plate and/or to infer and/or to display via an acoustical and/or optical display system a type and/or size and/or an identifier of the container.

The type of the container may for example be defined by a type designation, for example manufacturer and model.

The size may for example be defined by a diameter of the spherical shaped round flask or by the volume or the holding capacity of the container. An identifier of the container may include an unambiguous label of the container. Similarly, these sizes may be defined for the perforated plate. The size of the perforated plate may for example be defined by a size, for example diameter of the circle-shaped recess within the perforated plate. The arrangement may thus at least be adapted to determine from a determined traversal path or in particular from at least a quantity indicative for the traversal path and in particular based on the difference value, whether a perforated plate was placed onto the heater which is compatible with one of a plurality of standardized tests which may be previously selected.

According to an embodiment of the present invention, the arrangement is further adapted to allow a user to select from a selection of standardized tests a desired test to be performed; and/or to allow the user to put on a selected perforated plate onto the heater; and/or after traversing the heating system until the interruption, to display a warning, if the determined perforated plate and/or the traversed traversing length is not compatible with the selected test. Therefore, it may be ensured that the selected desired standardized test is actually carried out with the components associated with this test.

According to an embodiment of the present invention, the traversing system comprises an electrical step motor and a spindle, in particular arranged along (or parallel to) a trail, which is driven by the step motor or is drivable by the step motor. Therefore, conventionally available components may be employed for implementation of the method and may be employed for implementation of the arrangement. A step motor may be adapted to carry out a defined movement step in a directed manner, wherein the movement step includes or comprises a turn in a determined angle range. A step of the step motor may then correspond to a rotation of the spindle about a determined angle range, wherein the angle range not necessarily must equal to the angle range which is carried out by the motor upon the movement of one step. Optionally, a gear between the step motor and the spindle may be provided. A further component being engaged with the spindle, such as a rack rail, may upon turn of the spindle carry out a linear movement along the traversing path, i.e. in particular vertically upwards. A step of the motor therefore may correspond to a defined shift, i.e. a defined shift distance or a defined shift path length along the spindle. Thus, for example based on the monitored number of steps of the electro motor, a displacement path length of the rack rail may be inferred. The rack rail may for example traverse the carrier system or may be connected with the carrier system.

In particular, the carrier system may comprise a carrier element by which the heater is carried and may further comprise a traversal element, which for propulsion is engaged with the spindle and is in particular guided by the rail. Further, the carrier system may comprise a force measurement equipment, via which the carrier element is coupled with the traversal element. In particular, the traversal element may include a rack rail, which is engaged with the spindle and which converts a rotational movement of the spindle into a straight movement. The carrier element is not in a stiff or rigid mechanical connection with the traversal element, but is connected via an elastic element (for example included within the force measurement equipment). The measurement of the traversal path or the measurement of the quantity indicative for the position and/or the length of the traversal path may relate to the measurement of these parameters of the carrier element and/or the traversal element. In particular, the traversal element may be employed for this purpose, since it is primarily (i.e. directly via rigid mechanical elements) traversed using the motor. The carrier element is merely indirectly traversed, mediated by the force measurement equipment and the traversal element. The carrier element thus may be resiliently connected with the traversal element. When the carrier system is adapted in such a manner, beside a traversal of the heater, also a force measurement is enabled, in order to allow adjusting a defined compression force between the perforated plate and the container, but simultaneously to avoid a damage or disruption of components.

According to an embodiment of the present invention, the force measurement arrangement comprises: a spring whose one end is attached to the traverse element and whose other end is attached at the carrier element; a light barrier, coupled to the step motor, wherein the spring is compressed at the threshold value of the force by a defined distance, whereby the light barrier activates, to bring the traversing system to a halt.

The spring may for example comprise a spiral spring or a leaf spring or a combination of the same. The spring represents an elastic element which connects the traversal element with the carrier element. First, the edge of the recess of the perforated plate may contact an outer surface of the lower portion of the container, when the heater is approached so far towards the container. The arrangement then further traverses the heater with put on perforated plate upwards so that the edge of the recess of the perforated plate is pressed with increasing force at the outer edge of the container, because of which the spring is increasingly deformed, in particular compressed. With increasing compression of the spring, a switching sheet of a light barrier may approach and may interrupt the light barrier by sufficiently strong compression. The compression of the spring, in particular the compression path, may be related or connected with the compression force over a linear relationship (Hooke's law). This may be determined by a characteristic curve or previous calibration of the spring. Upon interrupting the light barrier, energy supply to the step motor may be interrupted or optionally a break may be employed. Thereby, the target position or the target state in the end position of the carrier system may be reached. Further fixation measures may be employed, for example magnet fixation or mechanical fixation, brake, etc., such as to maintain the achieved state of the required compression force. Then, if the system does not output a warning, a standardized test may be performed with the confidence, that the required test conditions are satisfied.

In an alternative embodiment, instead of a spring, an elastomer as elastic element may be utilized.

According to an embodiment of the present invention, the perforated plate and/or the container is compatible with at least one of the following standardized tests: ASTM D86, ASTM D850, ASTM D1078 or ISO 1078, respectively, at least in the version valid at the priority date.

The perforated plate and/or the container generally may be compatible with the following norms or standardized tests:

the norms ASTM D86, ISO 3405, IP 123, BS200-123, JIS K 2254, GOST 2177 for the distillation of fuels;

the norms ASTM D1078, IP195, BS2000-195, ASTM D850, ISO 918, BS 4591, JIS K 0066, ISO 4626 for the distillation of solvents; and the norms ASTM D524, IP 14, BS2000-14, ISO 4262, ASTM D4530, ISO 10370 for the provision of the distillation residue for determination of the coke residue.

According to an embodiment of the present invention it is provided a liquid analysis system, in particular automatic distillation unit, for determining evaporation properties of the liquid according to at least one standardized test, comprising: a container having an opening, in particular including a branch leading to a condenser; and an arrangement for closing the container having: at least one temperature measurement system, in particular for measuring a vapour temperature of the liquid within the container, with a bar and a temperature measurement sensor; a closing part for closing the container having a through-hole through which a portion of the bar is led such that the temperature measurement sensor is arranged within the container; optionally a support part protruding, traverse to the longitudinal direction of the bar, above the closing part which support part is slidable into a counterpart of an auxiliary arrangement; an arrangement for preparation of a distillation measurement of a liquid according to one of the preceding embodiments; and in particular several standardized perforated plates, which can be put onto the heater.

The temperature measurement system may comprise one or more temperature measurement sensors, for example a temperature measurement sensor, in particular Pt100-measurement sensor, which is adapted for determining the temperature of a gas phase of the liquid, in particular at a particular position within the container. Therefore, a vertical position of the first temperature measurement sensor may be adjustable, in particular by a screw-mechanism. A further second measurement sensor may be provided for measurement of a temperature at the bottom of the container, for example in order to allow determination of the dry point.

The closing part may vapor tightly close the container, may simultaneously however support the temperature measurements. The arrangement for closing the container may further comprise within an inner space, which is limited by a housing, evaluation electronics and an electronic storage, to allow storing for example calibration data from one or more temperature measurement sensors and/or to allow pre-processing of measurement data, such as a conversion in digital signals. Further, a communication interface may be provided within an electronic circuit within the inner space of the arrangement for closing, in order to transmit the in particular digital measurement data wirelessly or wire-based to an external evaluation unit.

The optional support part can hold or support the entire container when the arrangement for closing the container is inserted into the container opening. In particular, the support part can hold the container in a defined (in particular vertical) position when the arrangement for closing the container is completely inserted into the container opening. For this defined vertical position of the container, a defined traversal path or a defined pre-known traversal path length of the traversing the perforated plate towards the container for a particular combination of perforated plate and/or container may be pre-known. When the actual traversal length after completely traversing the heater at the lower side of the container does not correspond to this pre-known traversal length, it may be inferred that an erroneous assembly is present, such that an erroneous perforated plate and/or an erroneous container was used. This may be indicated to the user upon which the user may exchange the perforated plate and/or the container with the correct components.

It should be understood that features, individually or in any combination, which have been described, explained or provided in connection with an arrangement for preparation of a distillation measurement of a liquid or in connection with a liquid analysis system also, individually or in any combination, are applicable to a method for preparation of a distillation measurement of a liquid and vice versa, according to embodiments of the present invention.

According to an embodiment of the present invention it is provided a method for preparation of a distillation measurement of a liquid, comprising: selecting a perforated plate from a group of standardized perforated plates; putting the perforated plate onto a heater, which is adapted for heating a container containing the liquid being put onto the perforated plate for performing a standardized test for determining evaporation properties of the liquid; traversing the heater (e.g. upwards) towards the container; interrupting the traversing, if the pressure force exerted, by the perforated plate put onto the heater, against the container reaches a threshold value.

Embodiments of the present invention are now explained with reference to the accompanying drawings. The invention is not restricted to the illustrated or described embodiments.

DETAILED DESCRIPTION OF ILLUSTRATED EMBODIMENTS

Elements which have same or similar structure and/or function are labelled in the different figures by reference signs which differ solely in the first digit. The description of elements which are not described in detail in one figure may be taken from the description of these corresponding elements in another figure.

Figure 1:
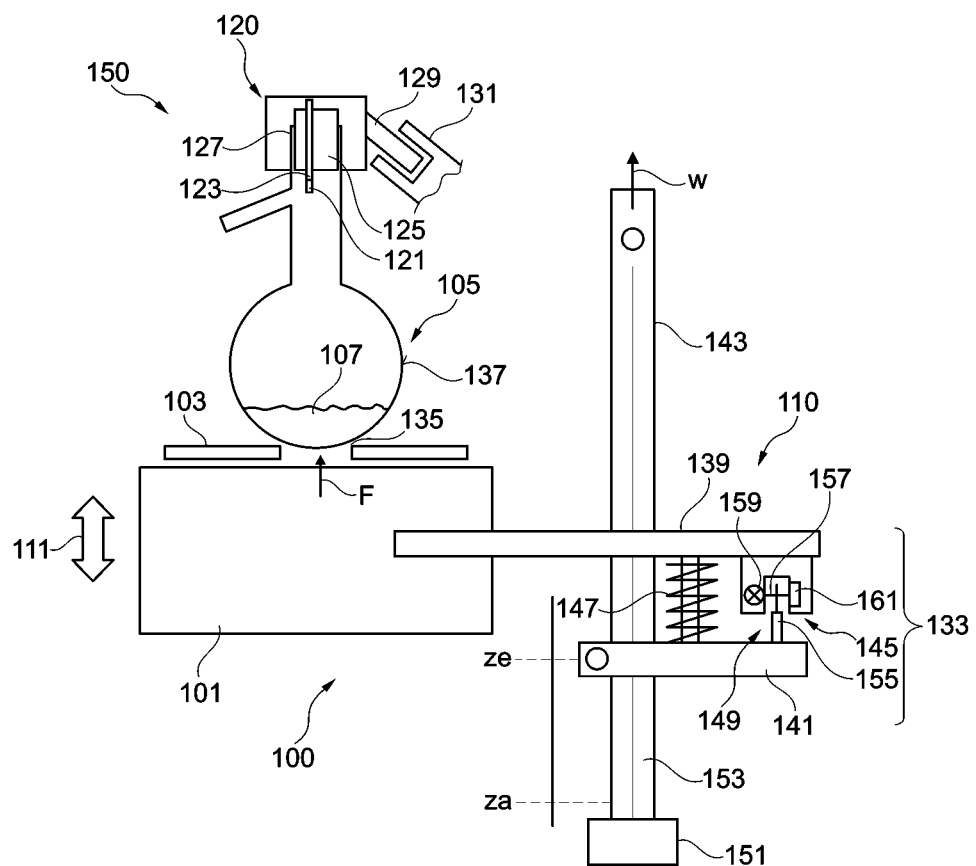
FIG. 1 illustrates in a schematic side view a liquid analysis system with an arrangement for preparation of a distillation measurement of a liquid according to an embodiment of the present invention.

FIG. 1 schematically illustrates a liquid analysis system 150 with an arrangement 100 for preparation of a distillation measurement of a liquid according to an embodiment of the present invention. The arrangement 100 comprises a heater 101, for example an electrical heater having a heating spiral onto which a perforated plate 103 selected from a group of standardized perforated plates can be put on, in particular at an upper side of the heater 101. Furthermore, the heater 101 is adapted for heating a container 105 containing the liquid and being put onto the perforated plate 103 for carrying out a standardized test for determination of evaporation properties of the liquid. The liquid 107 to be examined is contained within the container 105 which is in the illustrated embodiment adapted or configured as a glass round flask.

The arrangement 100 further includes an electrical traversing system 110 which is adapted to traverse the heater 101 (in particular together with the perforated plate 103) vertically upwards along a vertical direction 111 and to interrupt a further traversal of the heating system, if a compression force F of the perforated plate 103 put onto the heater 101 against the container 105 reaches a threshold value.

The container 105 is closed at an upper end using the arrangement 120 for closing the container close which is illustrated in FIG. 1 merely schematically. The arrangement 120 closes the container 105, in particular an upper opening of the container, vapor tightly and allows further a temperature measurement using at least one temperature measurement sensor 121 which is provided at an end of a bar 123. The bar 123 is completely guided through a closing part 125 of the arrangement 120, wherein the closing part 125 tightly lies with an outer surface against an inner surface of an opening wall 127 of the container 105.

The arrangement 120 further comprises a support part 129, which laterally protrudes inclinedly downwards and which is connected with a counterpart 131 of an auxiliary equipment only partly illustrated, which is in particular connected in a form-fit manner, in order to hold the arrangement 120 for closing the container including the container 105.

The traversing system 110 comprises a carrier system 133 by which the heater 101 is held. The arrangement 100 is adapted to monitor and/or to determine a quantity indicative for the length and/or the position z along a traversal path w of the carrier system 133.

The arrangement 100 is further adapted to traverse the carrier system 133 starting from a starting position za up to an end position ze of the carrier system, at which the compression force F reaches the threshold value. In FIG. 1, the state is illustrated, at which the carrier system is in the end position ze, at which the compression force F reaches the threshold value. In this state, the circular edge 135 of the perforated plate 103 exerts the compression force F towards a circular contact surface at the outer surface 137 of the container 105.

At the start position za, the associated quantity indicative for the position along the traversal path has a first value, for example w1, and the quantity associated with the end position ze which is indicative for the position along the traversal path w has a second value, for example w2. The arrangement 100 is further adapted, to calculate the difference between the first value w1 and the second value w2 as a difference value indicative for the traversed traversal length. The difference value may for example be equal or correspond for example to the number of steps of a step motor, which have been carried out by the step motor between the starting position za and the end position ze. Based on the difference value, for example the type and/or size of the perforated plate may be determinable.

The carrier system 133 includes a carrier element 139, by which the heater 101 is carried. The carrier element may for example be configured as a table and/or as an arm and/or as a bar, at which the heater is suitably fastened or put on. The carrier system 133 further comprises a traversal element 141, which for propulsion is engaged with a spindle 153, which is arranged along a rail 143. Further, the traversal element is guided by the rail 143 which is aligned in the vertical direction 111, along which the traversal path w runs.

The carrier system 133 further comprises a force measurement arrangement 145, via which the carrier element 139 is coupled with the traversal element 141. The traversal element may for example be configured as a traversal arm or as a traversal table. Only the traversal element 141 is engaged, for example via a rack rail, with the spindle arranged in or at the vertical rail 143, however not the carrier element 139. The carrier element 139 and thus the heater is merely indirectly or secondarily traversed, mediated by the force measurement arrangement 145, upon traversing the traversal element 141.

The force measurement arrangement 145 comprises a spring 147 whose one end is attached at the traversal element 141 and whose other end is attached at the carrier element 139. Further, the force measurement arrangement 145 comprises a light barrier 149 which is coupled with the step motor 151 which drives the spindle 153. An interruption element 155 of the light barrier 149 interrupts a light beam 157 which is emitted from a light source 159, in order to be not detected by a detector 161, if the spring 147 is compressed so far, that the threshold value of the compression force F is reached. FIG. 1 illustrates the state, in which the interruption element 155 between the light source 159 and the detector 161 is arranged, upon which the step motor 151 is controlled, to halt further movement.

The counterpart 131 of the support part 129 of the arrangement 120 for closing the container 105 may be attached at the rail 143 or may be attached at a further auxiliary equipment. Advantageously, however, is the attachment or fixed mechanical connection between the counterpart 131 and the rail 143, in order to bring the container into a defined predetermined position relative to the electrical traversing system 110.

Figure 2:
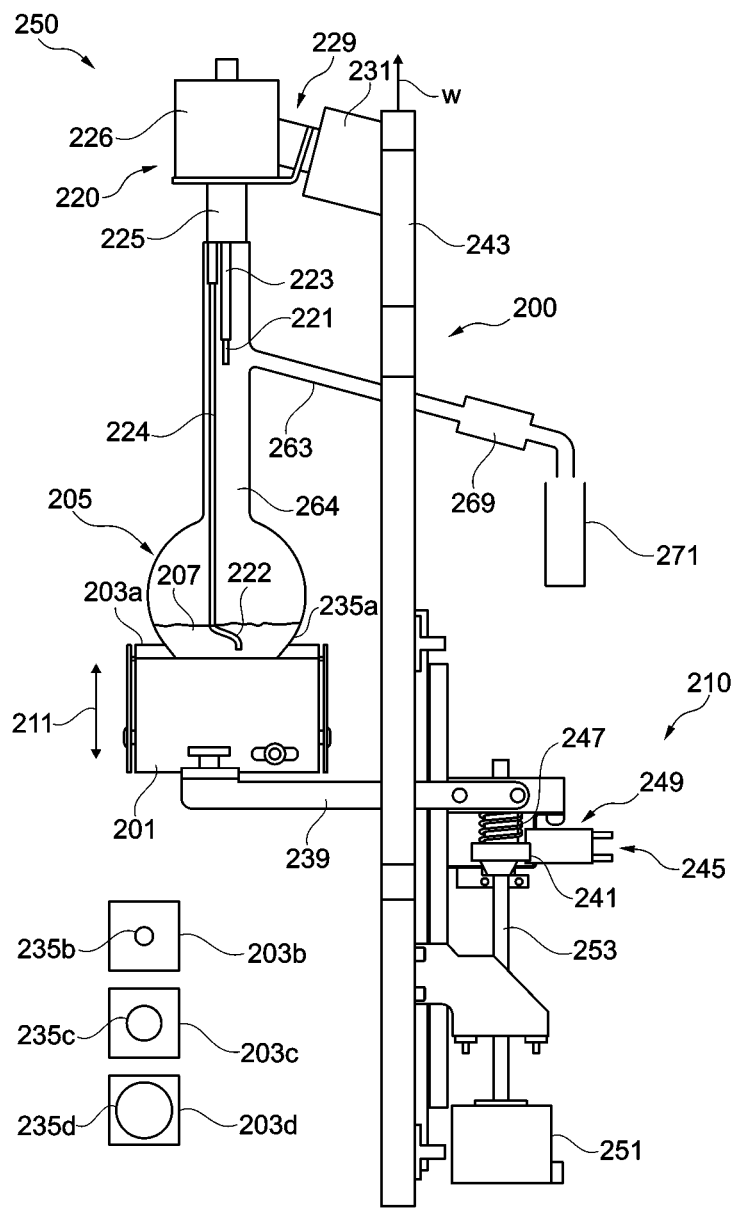
FIG. 2 schematically illustrates in a side view a liquid analysis system according to an embodiment of the present invention.

FIG. 2 schematically illustrates a liquid analysis system 250 according to an embodiment of the present invention which comprises an arrangement 200 for preparation of a distillation measurement of a liquid.

The liquid analysis system 250 which is illustrated in FIG. 2 has similarities to the liquid analysis system 150 which is illustrated in FIG. 1. The liquid analysis system 250 is in particular configured as an automatic distillation unit for determining evaporation properties of the liquid which is present within the container 205, according to at least one standardized test. The liquid analysis system 250 comprises the container 205 having an opening at an upper end and in particular having a branch 263 leading to a condenser 269. In the container 250, the liquid 207 to be examined is contained.

Further, the liquid analysis system 250 includes an arrangement 220 for closing the container 205. This arrangement 220 includes at least one temperature measurement system, in particular for measuring a vapor temperature of the liquid within the container 205 in the inner space 264. Thereby, the temperature measurement system includes a bar 223 having a temperature measurement sensor 221 at a lower end so that this temperature measurement sensor is arranged within the container within the inner space 264 and namely in particular adjustable in vertical height such that it is arranged approximately at the height of the branch 263 which leads to the condenser 269, which is only schematically illustrated. The condensate generated within the condenser 269 is collected in a collection cylinder 271, wherein the collection volume is measured.

The arrangement 220 further comprises a closing part 225 for closing the container, wherein the closing part 225 comprises a through-opening (not shown) through which a portion of the bar 223 is guided so that the temperature measurement sensor 221 is arranged within the container, in particular close to the branch 263.

Also, the arrangement 220 comprises a support part 229 which, above the closing part 225 protrudes transversely to the longitudinal direction, of the bar 223, which is slidable into the counterpart 231. In the embodiment illustrated in FIG. 2, the counterpart 231 is fixedly connected with the rail 243, along which the traversal path w runs, along which the heater 201 together with the perforated plate 203a is traversable, as indicated by two-headed arrow 211.

The liquid analysis system 250 thus includes also the arrangement 200 for preparation of a distillation measurement of the liquid and in particular several standardized perforated plates, which may be put onto the heater. Exemplarily are illustrated, beside the perforated plate 203a which is put onto the heater 201, further perforated plates 203b,c,d which comprise central openings or holes of different sizes.

For traversing (moving) the heater with the perforated plate, a traversing system 210 is provided. The traversing system 210 comprises an electrical step motor 251, which traverses a traversal element 241, which is via a spring 247 connected with a carrier element 239. The spring is, together with a light barrier 249, part of a force measurement equipment 245, which has a similar function as has been explained with reference to FIG. 1. A rack rail (not shown) converts the rotational movement of a spindle 253 which is driven by the step motor 251 into a straight movement of the heater 201, the perforated plate 203a and the container 205 along a direction 211 parallel to the traversal path w.

According to embodiments of the present invention, an automated method is provided, wherein the user as usually selects a perforated plate, such as one of the perforated plates 203a, 203b, 203c, 203d, which are illustrated in FIG. 2. In a next step, the selected perforated plate is put onto the heater 201 and an automatic upward traversal is started. Thereby, the heater is fully automatically together with the selected perforated plate, for example 203a, by a lift (or traversal system 210) shifted towards the flask or in general the container 205. A spring 247 is compressed, as soon as the perforated plate lies against the flask. If a threshold value of the spring force F is reached or exceeded (which is determined indirectly via a path measurement using the light barrier 249), the movement of the lift or the traversing system is stopped. A damage of the flask or container 205 is thereby avoided. Simultaneously, based on the traversal path (i.e. the steps carried out by the step motor for example), the diameter of the hole 235a,b,c,d within the selected perforated plate 203a,b,c,d is calculated and it is recognized, whether the correct perforated plate 203a,b,c,d was selected, in order to carry out a previously specified standardized test.

Embodiments of the present invention may be adapted to carry out standardized tests according to the norms ASTM D86, ASTM D850, D1078 or ISO 1078. In particular, these norms prescribe for perforated plates with four differently sized inner diameters of the openings. The heater including the perforated plate is moved from below towards the flask. Thereby, the perforated plate must tightly terminate with the flask. This is ensured in that the heater is slightly pressed against the flask. Thereby, in conventional arrangements and methods, the risk prevails, that the flask is damaged in the case of excessive pressure, for example glass breakage. When the user unintentionally selects the wrong perforated plate, the test must not be carried out.

The temperature of the vapour is measured in embodiments of the present invention using a Pt100-temperature sensor (for example the sensor 221, which is illustrated in FIG. 2). Thereby, the temperature sensor 221 is, via a bar 223, led through the closing part 225. Further, the arrangement 220 for closing the container comprises, beside the temperature measurement sensor 221, a further temperature measurement sensor 222, which measures the temperature at the bottom of the container, wherein the further temperature measurement sensor transmits, via a further bar 224, measurement signals to an inner space 226 within the arrangement 220, in which for example an electronic circuit is enclosed, in order to process the measurement signals and also to process the measurement signals of the (first) temperature measurement sensor 221, and to in particular apply a calibration, and also to apply a conversion in digital signals. Via not in detail illustrated electrical connections between the support part 229 and the counterpart 231, the in particular digital measurement signals are transmitted to a not in detail illustrated evaluation unit. Using the further temperature measurement sensor 222, for example a dry point may be determined, i.e. a point, when the last remainder of the liquid within the container is evaporated, since in this case, the temperature at the bottom of the container strongly increases.

Embodiments of the present invention allow further avoiding handling errors and in particular checking before start of a distillation measurement according to a standardized test, whether the perforated plate was employed which is according to the norm and which is compatible with the selected test.

Thereby, according to an embodiment of the present invention, the user can, in an automated unit, depending on the liquid sample or the distillation program, select one of the four perforated plates prescribed by the norm and further can select the associated flask or container and can start a measurement. A lift then leads the perforated plate from below towards the flask and presses it with a defined force at the flask, in order to seal the gap exactly.

The container 105 and the perforated plate 103 lying on the heater 101 are pressed against each other. Thereby, the lift (or the carrier element 139) is moved by the step motor 151, which moves via the spindle drive 153 the reception of the heater 101 along the guiding rail 143. At the both end points, end switches are present, so that the traversal path of the lift is clearly defined. Over the step resolution and the pitch of the spindle, the resolution of the traversal path is determined. The force measurement is carried out using a spring 147 and a light barrier 149 with a switching sheet 155. The stopping of the lift at a particular force is carried out via a compression of the spring with a defined spring constant. According to Hooke's law (F=D×ΔL), the compression by a length ΔL (for example 5 mm) corresponds at a fixed spring constant D (for example 0.5 N/mm) exactly to the force F. The stopping is carried out using a light barrier which triggers depending on the length of ΔL, so that the pressing of the heater against a flask with defined force F is ensured. When the perforated plate is guided from below towards the flask, the (via the path ΔL measured) spring force increases. If the threshold value is exceeded, the movement is stopped. Using the number of the performed steps of the step motor, the hole diameter or the corresponding perforated plate is inferred.

The following table illustrates four different determined traversal paths which combination of flask and perforated plate correspond thereto.

TABLE 1

| Flask | Perforated Plate | Traversal Path |
|---|---|---|
| 125 ml | 50 | 28 mm |
| 125 ml | 38 | 25 mm |
| 125 ml | 32 | 23 mm |
| 125 ml | 25 | 20 mm |
| 200 ml | 50 | 38 mm |
| 200 ml | 38 | 35 mm |
| 200 ml | 32 | 33 mm |
| 200 ml | 25 | 30 mm |

For the traversal paths given in table 1 a tolerance or accuracy of +/−1 mm is achieved. By aligning with the norm the user can check, whether the perforated plate according to the norm and the correct flask has been selected. If the user has selected the wrong perforated plate or the wrong flask, a warning may appear on a display or an acoustic signal may sound. If applicable, the user may be directed to exchange the perforated plate or the flask or it is prohibited to start a displacing mechanism. If not applicable, the correct components were employed.

It should be noted that the expression "having" (or "comprising") does not exclude other elements, and that the article "a" (or "an") does not exclude a plurality. Also, elements which are described in connection with different embodiment examples, may be combined.

The invention claimed is:

1. An arrangement for preparation of a distillation measurement of a liquid, comprising:
   a heater onto which a perforated plate selected from a group of standardized perforated plates may be disposed and which is adapted for heating a container containing the liquid, the container being configured to be disposed onto the perforated plate for performing a standardized test for determining evaporation properties of the liquid; and
   a traversing system which is adapted to traverse the heater and to interrupt a further traversing of the heater if a pressure force of the perforated plate put onto the heater against the container reaches a threshold value, wherein the traversing system comprises a traversable carrier system by which the heater is retained, and wherein the arrangement is adapted to determine a quantities indicative of a length along a traversing path of the traversable carrier system.

2. The arrangement according to claim 1, wherein the arrangement is adapted to traverse the traversable carrier system starting from a start position up to an end position of the traversable carrier system, at which end position the pressure force reaches the threshold value,
   wherein the quantities indicative of the length along the traversing path include a quantity that is associated with the start position that has a first value and wherein the quantities indicative for the position of the length along the traversing path include a quantity that is associated with the end position that has a second value, and wherein the arrangement is adapted to calculate a difference between the first value and the second value.

3. The arrangement according to claim 2, wherein the arrangement is further adapted
   to infer at least one of a type, a size, and an identifier of the perforated plate based on the difference and further based on at least one of a type, a size, and an identifier of the container.

4. The arrangement according to claim 3, wherein the arrangement is further adapted
   to infer at least one of a type, a size, and an identifier of the perforated plate based on the difference and to infer at least one of a type, a size, and an identifier of the container based on the difference.

5. The arrangement according to claim 1, wherein the arrangement is further adapted to allow at least one of:
   a selection of a desired standardized test to be performed;
   a selection of a perforated plate to be disposed onto the heater; and
   a warning to be displayed after the interruption if the traversed traversing length is not compatible with the selected test.

6. The arrangement according to claim 1, wherein the traversing system comprises:
   an electric step motor; and
   a spindle which is driven by the step motor which spindle is in particular arranged along a rail.

7. The arrangement according to claim 6, wherein the traversable carrier system comprises:
   a carrier element by which the heater is carried;
   a traverse element engaged with the spindle and which is guided by the rail; and
   a force measurement arrangement via which the carrier element is coupled with the traverse element.

8. The arrangement according to claim 7, wherein the force measurement arrangement comprises:
   a spring whose one end is attached to the traverse element and whose other end is attached at the carrier element; and
   a light barrier coupled to the electric step motor wherein the spring is compressed at the threshold value of the force by a defined distance whereby the light barrier activates to bring the traversing system to a halt.

9. The arrangement according to claim 1, wherein the perforated plate and the container are at least one of:
   compatible with at least one of the following standardized tests ASTM D86, ASTM D850, ASTM D1078 or ISO 1078, each at least in the version valid at the priority date
   compatible with at least one of the standard specifications ASTM D86, ISO 3405, IP 123, BS200-123, JIS K 2254, GOST 2177, respectively at least in the version valid at the priority date, for the distillation of fuels;
   compatible with at least one of the standardized tests or standard specifications ASTM D1078, IP195, BS2000-195, ASTM D850, ISO 918, BS 4591, JIS K 0066, ISO 4626, respectively at least in the version valid at the priority date, for the distillation of solvents; and
   compatible with at least one of the standardized specifications ASTM D524, IP 14, BS2000-14, ISO 4262, ASTM D4530, ISO 10370, respectively at least in the version valid at the priority date.

10. A liquid analysis system for determining evaporation properties of a liquid according to at least one standardized test, the system comprising:
    a container having an opening; and
    an arrangement for closing the container having:
    at least one temperature measurement system for measuring a vapor temperature of the liquid within the container with a bar and a temperature measurement sensor;
    a closing part for closing the container having a through-hole through which a portion of the bar is led such that the temperature measurement sensor is arranged within the container; and
    an arrangement for preparation of a distillation measurement of a liquid, the arrangement including:
    a heater adapted to support a perforated plate selected from a group of standardized perforated plates which together are adapted for heating a container containing the liquid for performing a standardized test for determining evaporation properties of the liquid; and
    a traversing system which is adapted to traverse the heater and to interrupt a further traversing of the heater if a pressure force of the perforated plate put onto the heater against the container reaches a threshold value, wherein the traversing system comprises a traversable carrier system, by which the heater is retained, and wherein the arrangement for preparation of a distillation measurement of a liquid is adapted to determine a quantity indicative for at least one of a length and a position along a traversing path of the traversable carrier system.

11. The liquid analysis system according to claim 10, further comprising:
a support part transversely protruding with respect to the longitudinal direction of the bar, wherein the support part is connected to a counterpart of an auxiliary arrangement.

12. The liquid analysis system according to claim 10, further comprising:
several standardized perforated plates which can be put onto the heater.

13. A method for preparation of a distillation measurement of a liquid, comprising:
selecting a perforated plate from a group of standardized perforated plates;
putting the perforated plate onto a heater which is adapted for heating a container containing the liquid being put onto the perforated plate for performing a standardized test for determining evaporation properties of the liquid;
traversing the heater towards the container using a traversing system, the traversing system being adapted to interrupt the traversing when a pressure force exerted by the perforated plate against the container reaches a threshold value, wherein a traversable carrier system by which the heater is retained is adapted to determine a quantity indicative of at least one of a length and a position along a traversing path of a traversable carrier system.

\* \* \* \* \*

UNITED STATES PATENT AND TRADEMARK OFFICE
CERTIFICATE OF CORRECTION

PATENT NO. : 10,837,929 B2
APPLICATION NO. : 16/413532
DATED : November 17, 2020
INVENTOR(S) : Frank Zimmermann, Carsten Kindt and Daniel Pergande Page 1 of 1

It is certified that error appears in the above-identified patent and that said Letters Patent is hereby corrected as shown below:

In the Claims

Column 15, Line 49, delete "3" and insert -- 2 --.

Signed and Sealed this
Nineteenth Day of January, 2021

Andrei Iancu
*Director of the United States Patent and Trademark Office*